United States Patent
Watson (10) Patent No.: US 12,407,837 B1
(45) Date of Patent: Sep. 2, 2025

(54) DISPLAY WITH CHROMATIC FOVEATION

(71) Applicant: Apple Inc., Cupertino, CA (US)

(72) Inventor: Andrew B Watson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 522 days.

(21) Appl. No.: 18/082,416

(22) Filed: Dec. 15, 2022

Related U.S. Application Data (60) Provisional application No. 63/308,377, filed on Feb. 9, 2022.

(51) Int. Cl.
| | | |
|---|---|---|
| *H04N 19/186* | (2014.01) | |
| *G06F 3/01* | (2006.01) | |
| *G09G 3/20* | (2006.01) | |

(52) U.S. Cl.
CPC ........... *H04N 19/186* (2014.11); *G06F 3/013* (2013.01); *G09G 3/2003* (2013.01); *G09G 2300/0452* (2013.01)

(58) Field of Classification Search
CPC .... H04N 19/186; G06F 3/013; G09G 3/2003; G09G 2300/0452
USPC .......................................................... 382/166
See application file for complete search history.

(56) References Cited

U.S. PATENT DOCUMENTS

| | | | |
|---|---|---|---|
| 1,111,384 A | 9/1914 | Hopkins | |
| 6,009,192 A | 12/1999 | Klassen et al. | |
| 6,829,301 B1 | 12/2004 | Tinker et al. | |
| 7,148,996 B2 | 12/2006 | Yeo et al. | |
| 10,424,097 B2 | 9/2019 | Vembar et al. | |
| 10,659,790 B2 | 5/2020 | Lu et al. | |
| 2005/0169551 A1* | 8/2005 | Messing | G09G 3/2003 382/260 |
| 2007/0252850 A1 | 11/2007 | Fujiwara et al. | |
| 2018/0103253 A1 | 4/2018 | Lu et al. | |
| 2018/0136720 A1 | 5/2018 | Spitzer et al. | |
| 2023/0156169 A1* | 5/2023 | Walters | G06N 3/09 375/240.01 |
| 2023/0395019 A1* | 12/2023 | Cai | G06F 3/147 |

* cited by examiner

*Primary Examiner* — Gabriel I Garcia
(74) *Attorney, Agent, or Firm* — Treyz Law Group, P.C.; Joseph F. Guihan (57) ABSTRACT

An electronic device may have a display and a gaze-tracking system. The display may use different resolutions in different portions of the display. Point-of-gaze information from the gaze-tracking system may be used to align a high-resolution portion of the display with the viewer's point-of-gaze. In the surrounding portions of the display, the resolution of the display may be decreased. This reduces power consumption, computation power, and bandwidth requirements without sacrificing the user experience. The resolution of the human eye is lower for purely chromatic signals than it is for luminance (brightness signals). To exploit this, the image data for the display may have an achromatic (white/black) luminance channel and two chromatic opponent channels. The opponent channels may then be compressed by a greater amount than the luminance channel, which increases the overall compression of the image data.

20 Claims, 8 Drawing Sheets

DISPLAY WITH CHROMATIC FOVEATION

This application claims the benefit of provisional patent application No. 63/308,377, filed Feb. 9, 2022, which is hereby incorporated by reference herein in its entirety.

BACKGROUND

This relates generally to electronic devices, and, more particularly, to electronic devices with displays.

Electronic devices often include displays. For example, an electronic device may have an organic light-emitting diode (OLED) display based on organic light-emitting diode pixels or a liquid crystal display (LCD) based on liquid crystal display pixels. If care is not taken, a display may require more power consumption and/or processing power than desired during operation.

SUMMARY

An electronic device may have a display such as an organic light-emitting diode (OLED) display or a liquid crystal display (LCD). The electronic device may also include a gaze-tracking system that is configured to determine the point-of-gaze of a viewer of the display.

To mitigate requirements for power consumption, computation power, and bandwidth, a display may use different resolutions in different portions of the display. In particular, point-of-gaze information from the gaze-tracking system may be used to align a high-resolution portion of the display with the viewer's point-of-gaze (where visual acuity is highest). In the surrounding portions of the display (e.g., in the peripheral vision of the viewer where visual acuity is lower), the resolution of the display may be decreased. This reduces power consumption, computation power, and bandwidth requirements without sacrificing the user experience.

The resolution of the human eye is lower for purely chromatic signals than it is for luminance (brightness signals). This is true both at a direct viewpoint and in the user's peripheral vision. To exploit this, the image data for the display may have an achromatic (white/black) luminance channel and two chromatic opponent channels. The opponent channels may then be compressed by a greater amount than the luminance channel, which increases the overall compression of the image data.

The electronic device may include color channel conversion circuitry (e.g., to convert image data between RGB color channels and opponent color channels) and compression circuitry that compresses the chromatic channel by a greater amount than the achromatic channel based on point-of-gaze information from the gaze-tracking system.

DETAILED DESCRIPTION

Figure 1:
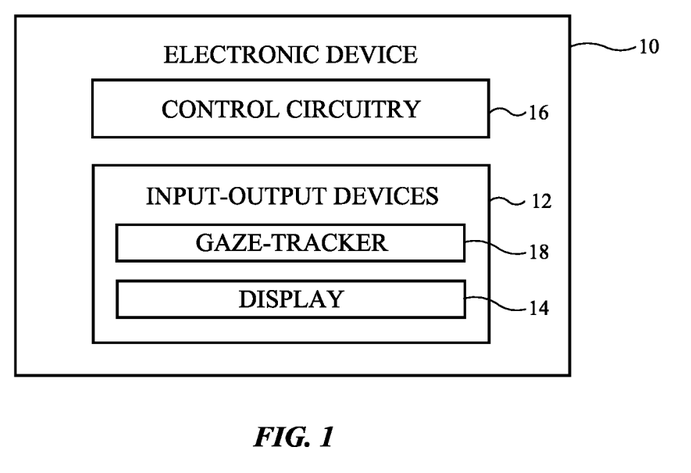
FIG. 1 is a schematic diagram of an illustrative electronic device having a display in accordance with various embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. The control circuitry may include storage such as hard disk drive storage, nonvolatile memory (e.g., flash memory or other electrically-programmable-read-only memory configured to form a solid state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a liquid crystal display, an organic light-emitting diode display, or any other desired type of display. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Input-output devices 12 may also include a gaze-tracker such as gaze-tracker 18 (sometimes referred to as a gaze-tracking system or a gaze-tracking camera). Gaze-tracker 18 may include a camera and/or other gaze-tracking system components (e.g., light sources that emit beams of light so that reflections of the beams from a user's eyes may be detected) to monitor the user's eyes. Gaze-tracker(s) 18 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 18 is merely illustrative.

Figure 2:
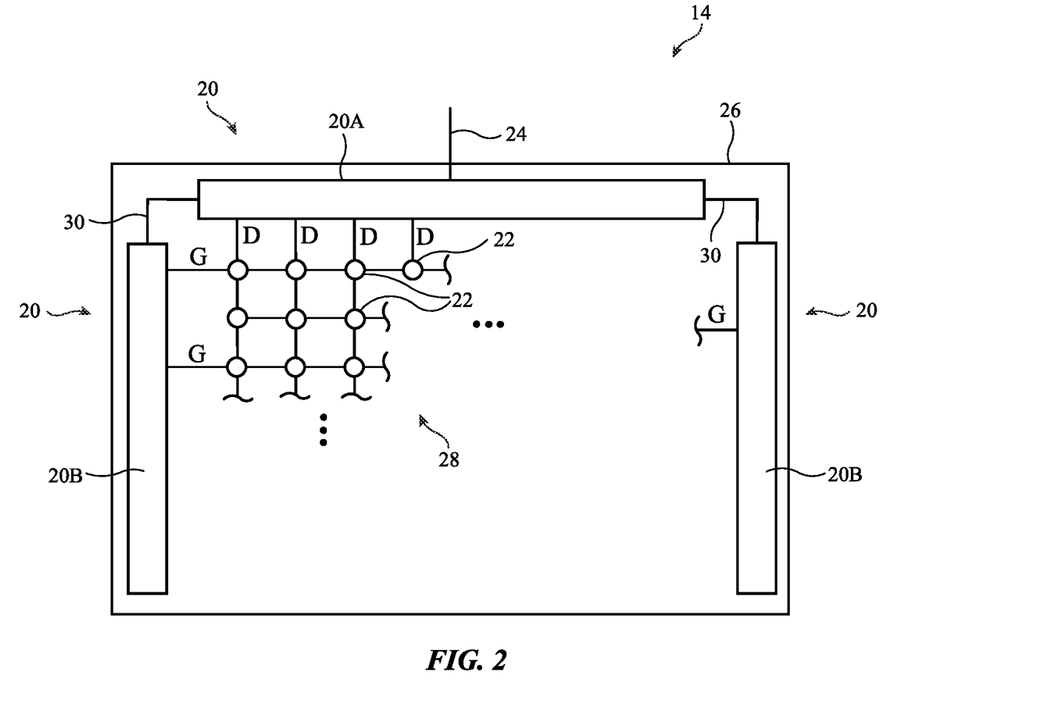
FIG. 2 is a schematic diagram of an illustrative display in accordance with various embodiments.

FIG. 2 is a diagram of an illustrative display. As shown in FIG. 2, display 14 may include layers such as substrate layer 26. Substrate layers such as layer 26 may be formed from rectangular planar layers of material or layers of material with other shapes (e.g., circular shapes or other shapes with one or more curved and/or straight edges). The substrate layers of display 14 may include glass layers, polymer layers, silicon layers, composite films that include polymer and inorganic materials, metallic foils, etc.

Display 14 may have an array of pixels 22 for displaying images for a user such as pixel array 28. Pixels 22 in array 28 may be arranged in rows and columns. The edges of array 28 may be straight or curved (i.e., each row of pixels 22 and/or each column of pixels 22 in array 28 may have the same length or may have a different length). There may be any suitable number of rows and columns in array 28 (e.g., ten or more, one hundred or more, or one thousand or more, etc.). Display 14 may include pixels 22 of different colors. As an example, display 14 may include red pixels, green pixels, and blue pixels.

Display driver circuitry 20 may be used to control the operation of pixels 28. Display driver circuitry 20 may be formed from integrated circuits, thin-film transistor circuits, and/or other suitable circuitry. Illustrative display driver circuitry 20 of FIG. 2 includes display driver circuitry 20A and additional display driver circuitry such as gate driver circuitry 20B. Gate driver circuitry 20B may be formed along one or more edges of display 14. For example, gate driver circuitry 20B may be arranged along the left and right sides of display 14 as shown in FIG. 2.

As shown in FIG. 2, display driver circuitry 20A (e.g., one or more display driver integrated circuits, thin-film transistor circuitry, etc.) may contain communications circuitry for communicating with system control circuitry over signal path 24. Path 24 may be formed from traces on a flexible printed circuit or other cable. The control circuitry may be located on one or more printed circuits in electronic device 10. During operation, control circuitry (e.g., control circuitry 16 of FIG. 1) may supply circuitry such as a display driver integrated circuit in circuitry 20 with image data for images to be displayed on display 14. Display driver circuitry 20A of FIG. 2 is located at the top of display 14. This is merely illustrative. Display driver circuitry 20A may be located at both the top and bottom of display 14 or in other portions of device 10.

To display the images on pixels 22, display driver circuitry 20A may supply corresponding image data to data lines D while issuing control signals to supporting display driver circuitry such as gate driver circuitry 20B over signal paths 30. With the illustrative arrangement of FIG. 2, data lines D run vertically through display 14 and are associated with respective columns of pixels 22.

Gate driver circuitry 20B (sometimes referred to as gate line driver circuitry or horizontal control signal circuitry) may be implemented using one or more integrated circuits and/or may be implemented using thin-film transistor circuitry on substrate 26. Horizontal control lines G (sometimes referred to as gate lines, scan lines, emission control lines, etc.) run horizontally through display 14. Each gate line G is associated with a respective row of pixels 22. If desired, there may be multiple horizontal control lines such as gate lines G associated with each row of pixels. Individually controlled and/or global signal paths in display 14 may also be used to distribute other signals (e.g., power supply signals, etc.).

Gate driver circuitry 20B may assert control signals on the gate lines G in display 14. For example, gate driver circuitry 20B may receive clock signals and other control signals from circuitry 20A on paths 30 and may, in response to the received signals, assert a gate line signal on gate lines G in sequence, starting with the gate line signal G in the first row of pixels 22 in array 28. As each gate line is asserted, data from data lines D may be loaded into a corresponding row of pixels. In this way, control circuitry such as display driver circuitry 20A and 20B may provide pixels 22 with signals that direct pixels 22 to display a desired image on display 14. Each pixel 22 may have a light-emitting diode and circuitry (e.g., thin-film circuitry on substrate 26) that responds to the control and data signals from display driver circuitry 20.

Gate driver circuitry 20B may include blocks of gate driver circuitry such as gate driver row blocks. Each gate driver row block may include circuitry such output buffers and other output driver circuitry, register circuits (e.g., registers that can be chained together to form a shift register), and signal lines, power lines, and other interconnects. Each gate driver row block may supply one or more gate signals to one or more respective gate lines in a corresponding row of the pixels of the array of pixels in the active area of display 14.

Display 14 may be a foveated display. Using gaze-tracking (e.g., using gaze-tracker 18 to capture information on the location of a user's gaze on display 14), device 10 may determine which portion of display 14 is being viewed only by a user's peripheral vision and which portion of display 14 is being viewed directly (non-peripherally) by a user (e.g., in the centermost 5° of the user's field of view corresponding to the fovea of the user's eyes where visual acuity is elevated). A user will be less sensitive to artifacts and low resolution in portions of display 14 that lie within the user's peripheral vision than portions of display 14 that are being directly viewed (i.e., at a user's point-of-gaze). Accordingly, device 10 may display different portions of an image with different resolutions. Displays that display different portions of an image with different resolutions to correspond to the visual acuity of a user's eye may be referred to as foveated displays.

Figure 3:
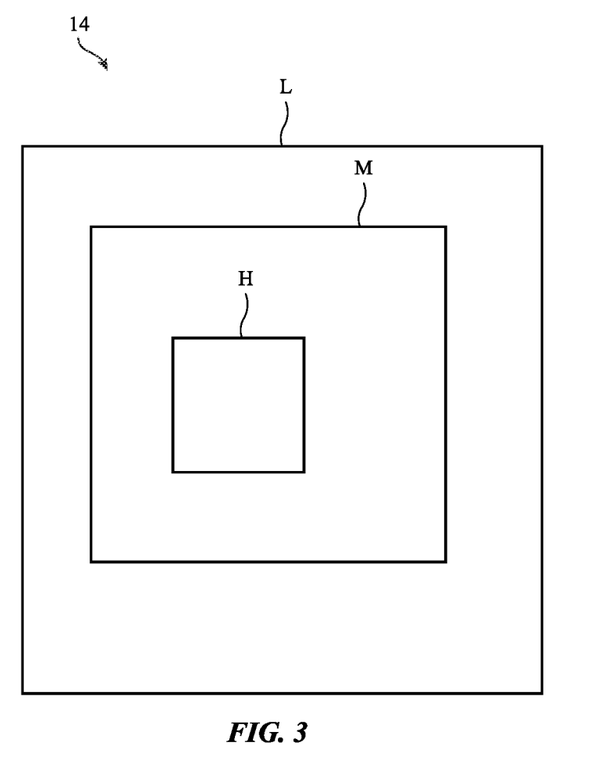
FIG. 3 is a top view of an illustrative foveated display having different portions with different resolutions in accordance with various embodiments.

FIG. 3 is a top view of a foveated display with different portions having different resolutions. Display 14 may have first portion with a high resolution such as high-resolution portion H, may have a second portion with a medium resolution (that is lower than the high resolution) such as medium-resolution portion M, and may have a lower-resolution peripheral portion such as lower-resolution portion L (with a resolution that is lower than the medium resolution).

In some cases, the position of portions H, M, and L in display 14 may be fixed. This type of display may be used in cases where a user is expected to normally or always be looking at a given portion of the display (e.g., the center of portion H in FIG. 3). This type of fixed (over time) but spatially varying resolution may be referred to as static foveation.

Alternatively, in some cases the resolution of display 14 may be dynamically adjustable over time. The shapes, sizes, and/or locations of portions H, M, and L may be varied dynamically during operation of the display based on information from gaze-tracker 18. This type of resolution variation may be referred to as dynamic foveation.

There are many options for hardware features that may be included in display 14 to allow an image to have different resolutions in different portions of the display. One or more data lines across the display may optionally be shorted together (e.g., using switches) to help implement the dynamic foveation. One or more gate lines across the display may optionally be shorted together (e.g., using switches) to help implement the dynamic foveation. Gate driver circuitry in the display may have gate blocks with outputs having a dynamically adjustable resolution to help implement the dynamic foveation. Data driver circuitry in the display may have register circuits with outputs having a dynamically adjustable resolution to help implement the dynamic foveation. In general, any or all of the aforementioned techniques and/or other desired techniques may be used to implement dynamic foveation in display 14.

Figure 4:
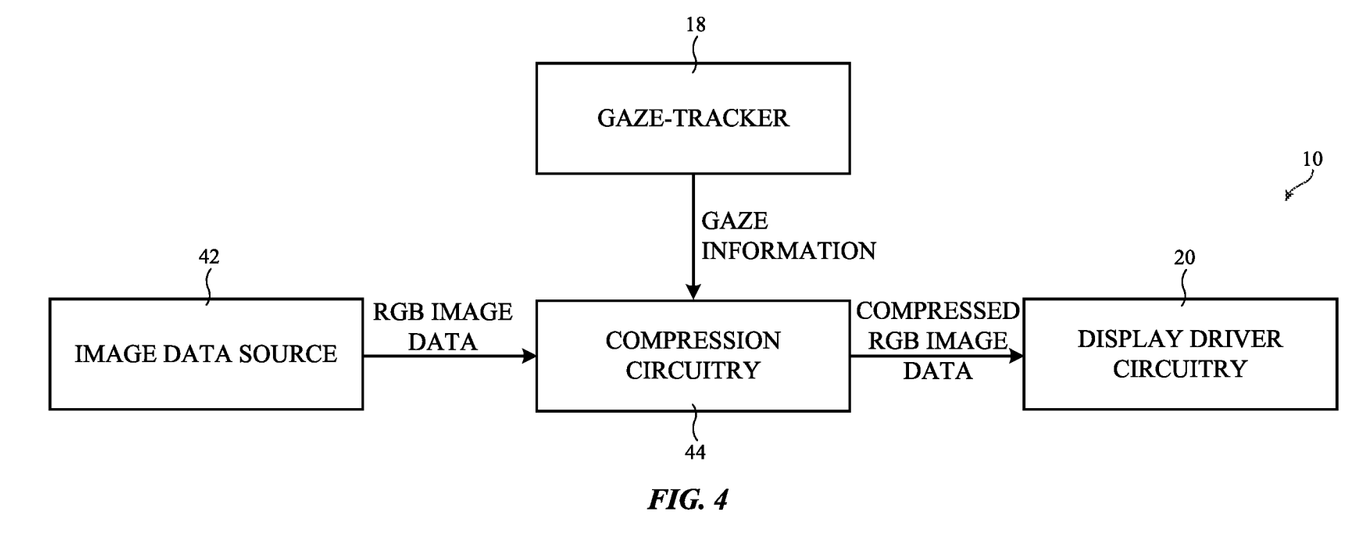
FIG. 4 is a schematic diagram of an illustrative electronic device with compression circuitry for a foveated display in accordance with various embodiments.

A schematic diagram of an illustrative electronic device with a foveated display is shown in FIG. 4. As shown, the electronic device may include an image data source 42. The image data source may be, for example, a graphics processing unit (GPU) that is configured to generate image data. As another example, the image data source may be a camera that captures images of device 10's surroundings. This may enable operation of a pass-through camera, where the real-world surroundings of device 10 are displayed on display 14. In other words, the pass-through camera (that may serve as an image data source 42) may face away from the user during operation (in contrast to a camera in gaze-tracker) that faces towards the user during operation.

In the example of FIG. 4, the image data source 42 provides image data in three color channels: red, green, and blue. This type of image data may sometimes be referred to as RGB image data. The red channel includes brightness values for red pixels in display 14, the green channel includes brightness values for green pixels in display 14, and the blue channel includes brightness values for blue pixels in display 14.

The RGB image data from image data source 42 may include brightness values for the full resolution of display 14. For example, consider an example where display 14 includes an m×n array of pixels for a total of y pixels. Each pixel may include a red sub-pixel, a green sub-pixel, and a blue sub-pixel. The RGB image data may include an m×n matrix of red brightness values corresponding to the red sub-pixels in the display, an m×n matrix of green brightness values corresponding to the green sub-pixels in the display, and an m×n matrix of blue brightness values corresponding to the blue sub-pixels in the display.

The RGB image data from source 42 may be compressed by compression circuitry 44 based on gaze information from gaze-tracker 18. Compression circuitry 44 may maintain a full resolution (sometimes referred to as a maximum resolution) in a region of the display that is aligned with the user's point-of-gaze (as identified by the gaze information). This region may correspond to portion H in FIG. 3, for example. In the remaining portions of the display, the image data may be downsampled to provide display regions of lower resolution. Again considering FIG. 3, the image data corresponding to portion M of the display may be downsampled to have a second resolution that is less than the maximum resolution. Portion M may have a resolution that is 50% of the maximum resolution, as one example. The image data corresponding to portion L of the display may be downsampled to have a third resolution that is less than the second resolution. Portion L may have a resolution that is 25% of the maximum resolution, as one example. The relative resolutions of portions H, M, and L are merely illustrative. In general, each portion may have any desired resolution (with the resolution of portion H greater than the resolution of portion M which is greater than the resolution of portion L).

In FIG. 4, the compression circuitry may compress the image data from the red color channel, the image data from the green color channel, and the image data from the blue color channel in the same manner (equally). In other words, the dimensions and locations of portions H, M, and L are the same for the red, blue, and green image data.

The compressed RGB image data is provided from compression circuitry 44 to display driver circuitry 20. Display driver circuitry 20 may then use the compressed RGB image data to display images having the target resolutions on the pixels 22.

Compressing the image data as in FIG. 4 greatly reduces the bandwidth required to transfer the image data to display driver circuitry 20. For example, the total number of data points in the compressed RGB image data may be about 15% of the total number of data points in the initial (uncompressed) RGB image data from source 42. This compression helps electronic device 10 satisfy power consumption, computation power, and bandwidth limitations without sacrificing the user experience (since the user will still perceive a sufficiently high resolution at their point of gaze due to the foveation of the display).

As previously mentioned, in FIG. 4, each color channel is compressed by the same amount. However, this example is merely illustrative. In an alternative arrangement, different color channels may be compressed by different amounts. This type of compression scheme (sometimes referred to as a chromatic compression scheme, varying compression scheme, chromatic foveation scheme, dynamic chromatic foveation scheme, etc.) may be used to take advantage of certain properties of the human eye.

In particular, the resolution of the human eye is lower for purely chromatic signals than it is for luminance (brightness signals). This is true both at a direct viewpoint and in the user's peripheral vision. To exploit this, the image data for the display may have an achromatic (white/black) luminance channel and two chromatic opponent channels. The opponent channels may then be compressed by a greater amount than the luminance channel, which increases the overall compression of the image data relative to the achromatic compression of FIG. 4.

The opponent color theory suggests that the human eye records differences between light brightness levels rather than the brightness levels in isolation. There are therefore three opposing color pairs (red versus green, blue versus yellow, and black versus white) detected by the eye. In conjunction with the opponent color theory, image data may be represented using opponent color channels (OCCs) instead of RGB color channels. The opponent color channels include an achromatic channel (that represents luminance) and two opponent (chromatic) channels such as red-green and yellow-blue. During compression of image data for the foveated display, the achromatic channel may be compressed by less than the chromatic channels. This takes advantage of the human eye having greater visual acuity in the achromatic channel than in the first and second chromatic channels.

Figure 5:
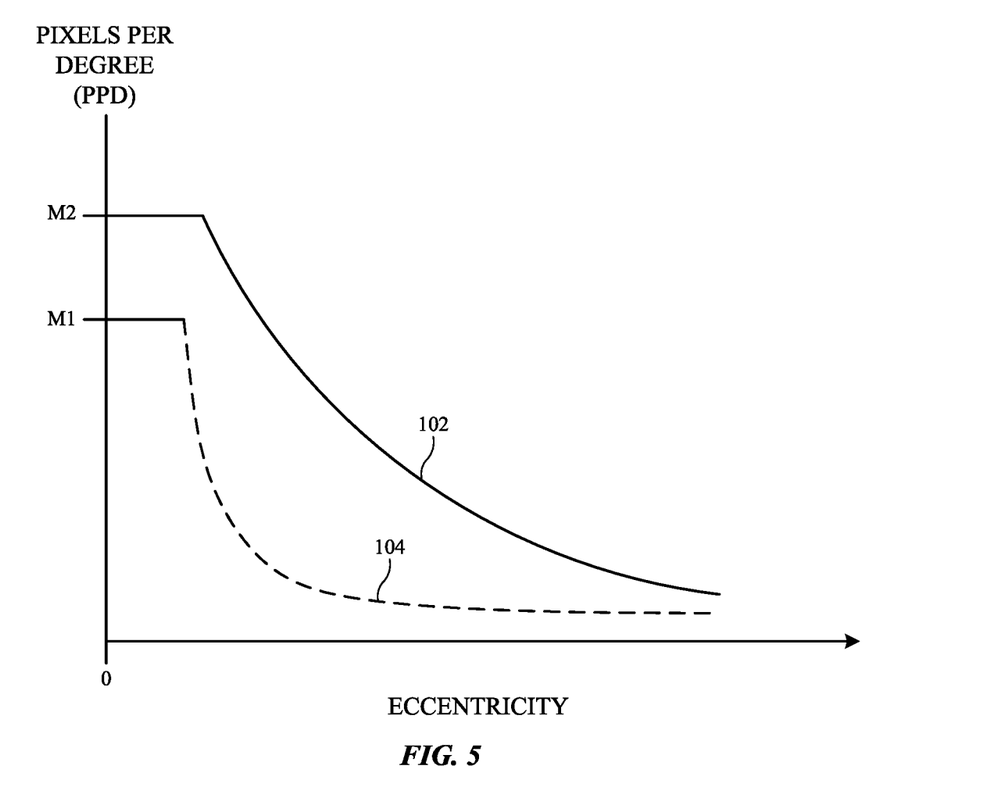
FIG. 5 is a graph of visual resolution of the human eye in pixels per degree as a function of eccentricity in accordance with various embodiments.

FIG. 5 is a graph of visual resolution of the human eye in pixels per degree (or PPD) as a function of eccentricity (e.g., the angle of light incident on the eye). Profile 102 shows the visual resolution in the achromatic channel (e.g., luminance) whereas profile 104 shows the visual resolution in a chromatic channel (e.g., red-green or yellow-blue). As shown in FIG. 5, at an eccentricity of 0 degrees (e.g., the eye's direct viewpoint), the resolution is at a maximum. However, the maximum resolution for the achromatic channel (M2) is greater than the maximum resolution for the chromatic channel (M1). Additionally, the visual resolution drops more quickly in the chromatic channel than in the achromatic channel as shown by the difference in profiles 102 and 104.

Figure 6A:
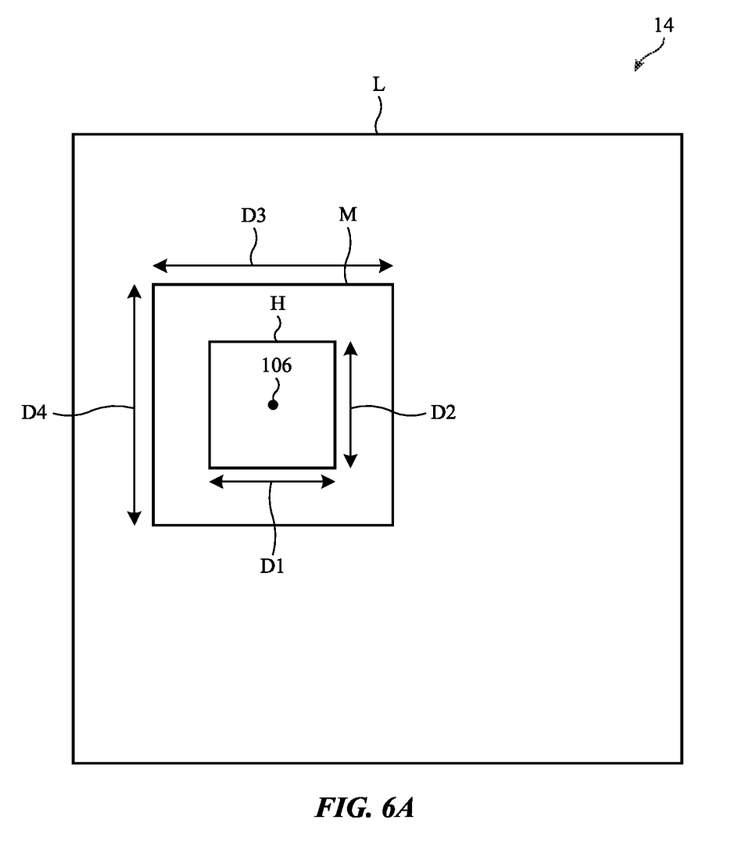
FIG. 6A is a top view of a foveation scheme that may be applied to the achromatic channel of opponent color channels in accordance with various embodiments.
Figure 6B:
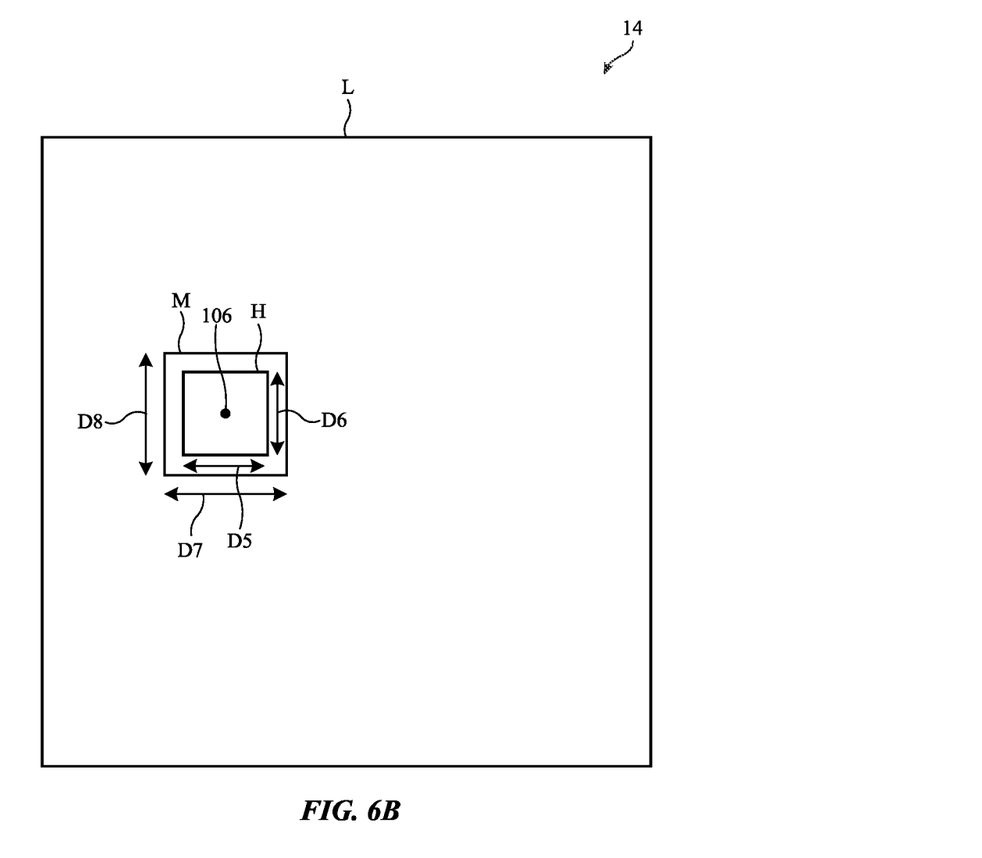
FIG. 6B is a top view of a foveation scheme that may be applied to the chromatic channels of opponent color channels in accordance with various embodiments.

The foveation scheme applied to the opponent color channels may reflect these differences in perception in the human eye. FIG. 6A is a top view of a foveation scheme that may be applied to the achromatic channel of the opponent color channels whereas FIG. 6B is a top view of a foveation scheme that may be applied to the chromatic channels (e.g., red-green and yellow-blue) of the opponent color channels. In this example, the foveation applied to the first and second chromatic channels is the same. However, it should be understood that different foveation schemes may be used for the first and second chromatic channels if desired. In general, the foveation scheme for the first and second chromatic channels will involve more compression than the foveation scheme for the achromatic channel.

As shown in FIGS. 6A and 6B, for both the chromatic and achromatic channels, three portions having different resolutions may be used. A first or high-resolution portion H may have a first resolution. A second or medium-resolution portion M may have a second resolution that is lower than the first resolution. A third or low-resolution portion L may have a third resolution that is lower than the first and second resolutions.

For both the achromatic and chromatic channels, the high-resolution portion H and medium-resolution portion M may be centered on a point of gaze 106 of the user (as determined by gaze-tracker 18). However, the high-resolution portion H for the chromatic channels (in FIG. 6B) is smaller than the high-resolution portion H for the achromatic channel (in FIG. 6A). As shown in FIG. 6A, the high-resolution portion H for the achromatic channel has a width D1 and length D2. As shown in FIG. 6B, the high-resolution portion H for the chromatic channels has a width D5 and length D6. D1 may be less than D5 and/or D6 (e.g., by more than 3%, more than 5%, more than 10%, more than 20%, more than 50%, etc.) and D2 may be less than D5 and/or D6 (e.g., by more than 3%, more than 5%, more than 10%, more than 20%, more than 50%, etc.). In both FIGS. 6A and 6B, portion H may have any desired shape (e.g., square, non-square rectangular, circular, an irregular shape, etc.).

The total area of the high-resolution portion for the achromatic channel (equal to D1×D2) may therefore be greater than the total area of the high-resolution portion for the chromatic channels (equal to D5×D6). The total area of the high-resolution portion for the achromatic channel may be greater than the total area of the high-resolution portion for the chromatic channels by more than 3%, more than 5%, more than 10%, more than 20%, more than 50%, more than 100%, less than 100%, etc.

Similarly, the medium-resolution portion M for the chromatic channels (in FIG. 6B) is smaller than the medium-resolution portion M for the achromatic channel (in FIG. 6A). As shown in FIG. 6A, the medium-resolution portion M for the achromatic channel has a width D3 and length D4. As shown in FIG. 6B, the medium-resolution portion M for the chromatic channels has a width D7 and length D8. D3 may be less than D7 and/or D8 (e.g., by more than 3%, more than 5%, more than 10%, more than 20%, more than 50%, etc.) and D4 may be less than D7 and/or D8 (e.g., by more than 3%, more than 5%, more than 10%, more than 20%, more than 50%, etc.). In both FIGS. 6A and 6B, the outer border of portion M may have any desired shape (e.g., square, non-square rectangular, circular, an irregular shape, etc.). In both FIGS. 6A and 6B, portion M forms a ring (e.g., completely laterally surrounds) portion H.

The total area of the medium-resolution portion for the achromatic channels (equal to (D3×D4)−(D1×D2)) may therefore be greater than the total area of the medium-resolution portion for the chromatic channel (equal to (D7×D8)−(D5×D6)). The total area of the medium-resolution portion for the achromatic channels may be greater than the total area of the medium-resolution portion for the chromatic channel by more than 3%, more than 5%, more than 10%, more than 20%, more than 50%, more than 100%, less than 100%, etc.

The total area of the low-resolution portion for the chromatic channels may be greater than the total area of the low-resolution portion for the achromatic channel by more than 3%, more than 5%, more than 10%, more than 20%, more than 50%, more than 100%, less than 100%, etc.

Figure 7:
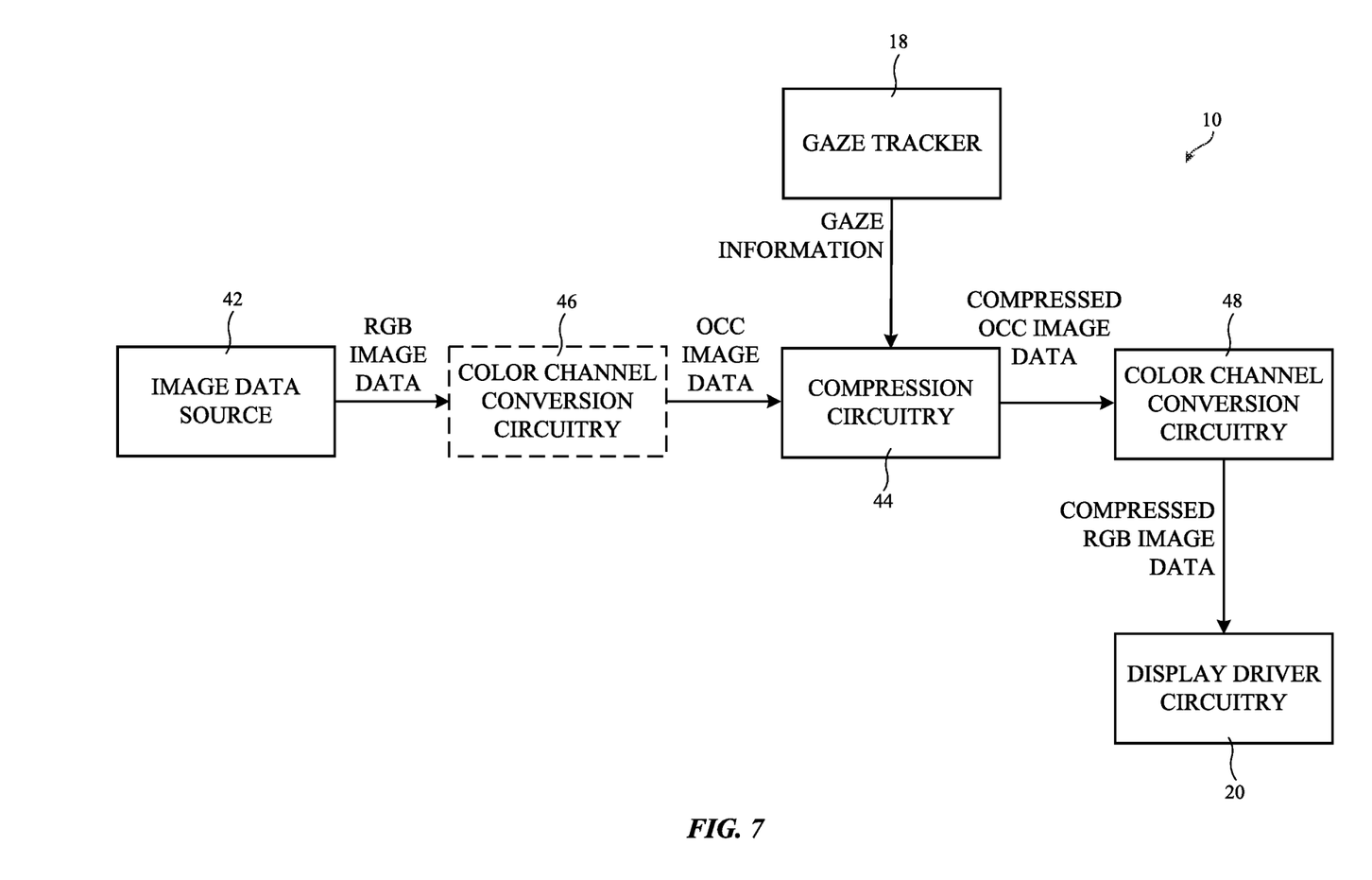
FIG. 7 is a schematic diagram of an illustrative electronic device that implements dynamic chromatic foveation in accordance with various embodiments.

FIG. 7 is a schematic diagram of an illustrative electronic device that implements dynamic chromatic foveation. In FIG. 7, an image data source 42 may provide image data (similar to as discussed in connection with FIG. 4). In some cases, the image data source may provide the image data in the opponent color channels (OCCs). Alternatively, in other arrangements such as the device in FIG. 7, the image data source may initially provide RGB image data. Device 10 may optionally include color channel conversion circuitry 46 to convert the RGB image data to OCC image data (when the image data source initially provides RGB image data). The color channel conversion circuitry 46 receives RGB image data and transforms the RGB image data into image data for opponent color channels. Color channel conversion circuitry 46 may use one or more formulas to convert the input image data in the RGB channels to output data in the OCCs. Color channel conversion circuitry 46 may be formed integrally with image data source 42 if desired.

Color channel conversion circuitry 46 provides the (uncompressed) OCC image data to compression circuitry 44. Compression circuitry 44 then compresses the OCC image data. Compression circuitry 44 may compress the image data for the achromatic color channel differently than the image data for the chromatic channels. For the achromatic color channel, the compression circuitry 44 maintains a full resolution (sometimes referred to as a maximum resolution) for a region of the display that is aligned with the user's point-of-gaze (e.g., portion H in FIG. 6A). In the remaining portions of the display, the image data may be downsampled to provide display regions of lower resolution. The image data corresponding to portion M of the display in FIG. 6A may be downsampled to have a second resolution that is less than the maximum resolution. Portion M in FIG. 6A may have a resolution that is 50% of the maximum resolution, as one example. The image data corresponding to portion L of the display in FIG. 6A may be downsampled to have a third resolution that is less than the second resolution. Portion L may have a resolution that is 25% of the maximum resolution, as one example.

For both of the chromatic color channels in the OCC image data, the compression circuitry 44 maintains a full resolution (sometimes referred to as a maximum resolution) for a region of the display that is aligned with the user's point-of-gaze (e.g., portion H in FIG. 6B). In the remaining portions of the display, the image data may be downsampled to provide display regions of lower resolution. The image data corresponding to portion M of the display in FIG. 6B may be downsampled to have a second resolution that is less than the maximum resolution. Portion M in FIG. 6B may have a resolution that is 50% of the maximum resolution, as one example. The image data corresponding to portion L of the display in FIG. 6B may be downsampled to have a third resolution that is less than the second resolution. Portion L may have a resolution that is 25% of the maximum resolution, as one example.

Therefore, both the chromatic color channels and the achromatic color channels are compressed by compression circuitry 44. However, the chromatic and achromatic color channels are compressed by different amounts (to correspond to the different resolution regions in FIGS. 6A and 6B). The overall compression of the chromatic color channels may be at least 5% more than the achromatic color channel, at least 10% more than the achromatic color channel, at least 20% more than the achromatic color channel, at least 50% more than the achromatic color channel, at least 70% more than the achromatic color channel, at least 100% more than the achromatic color channel, between 50% and 100% more than the achromatic color channel, etc. This may result in a greater overall compression than when compression is performed in the RGB color channels (as in FIG. 4). For example, the total number of data points in the compressed OCC image data may be about 10% of the total number of data points in the initial (uncompressed) image data from source 42 (as opposed to 15% for the device of FIG. 4). This additional compression relative to device 10 in FIG. 4 provides additional improvements in power consumption, computation power, and bandwidth without sacrificing the user experience (since the additional chromatic compression is not detectable to the user).

The relative resolutions of portions H, M, and L described above are merely illustrative. In general, each portion of each channel may have any desired resolution (with the resolution of portion H greater than the resolution of portion M which is greater than the resolution of portion L).

The compressed OCC image data from compression circuitry 44 is provided to color channel conversion circuitry 48. The color channel conversion circuitry 48 may convert the compressed image data from circuitry 44 from the opponent color channels to the RGB color channels. The compressed RGB image data (with brightness values corresponding to the red, blue, and green sub-pixels in the display) is then used by display driver circuitry 20 to display images on the display.

Image data source 42, color channel conversion circuitry 46, compression circuitry 44, color channel conversion circuitry 48, and/or display driver circuitry 20 may be considered part of control circuitry 16 in FIG. 1. Any or all of data source 42, color channel conversion circuitry 46, compression circuitry 44, color channel conversion circuitry 48, and display driver circuitry 20 may include storage such as hard disk drive storage, nonvolatile memory (e.g., flash memory or other electrically-programmable-read-only memory configured to form a solid state drive), volatile memory (e.g., static or dynamic random-access memory), etc. Any or all of data source 42, color channel conversion circuitry 46, compression circuitry 44, color channel conversion circuitry 48, and display driver circuitry 20 may also include one or more microprocessors, microcontrollers, digital signal processors, baseband processors, power management units, application specific integrated circuits, etc. Any or all of data source 42, color channel conversion circuitry 46, compression circuitry 44, color channel conversion circuitry 48, and display driver circuitry 20 may be formed from common/integral components if desired (e.g., a single microprocessor or application specific integrated circuit may include both color conversion circuitry 46 and compression circuitry 44).

In FIG. 7, gaze-tracker 18, image data source 42, color channel conversion circuitry 46, compression circuitry 44, color channel conversion circuitry 48, and display driver circuitry 20 are part of a single electronic device 10. This example is merely illustrative. If desired, one or more components of FIG. 7 may be formed in a separate electronic device that is operable in a system with the electronic device that includes display 14. For example, electronic device 10 may be paired with an additional electronic device. The additional electronic device may include the image data source 42, color channel conversion circuitry 46, and compression circuitry 44. Electronic device 10, meanwhile, includes gaze-tracker 18, color channel conversion circuitry 48, display driver circuitry 20, and display 14. In this type of system, the compressed OCC image data may be transmitted from the additional electronic device to electronic device 10 (e.g., using a wired or wireless link). The low bandwidth provided by the chromatic foveation performed in FIG. 7 eases this data transfer between devices.

Additionally, in this type of system, gaze information may be transmitted from the electronic device 10 to the additional electronic device (e.g., using a wired or wireless link) to be used by the compression circuitry in the additional electronic device. This example is merely illustrative. In general, the components of FIG. 7 may be split between one or more devices as desired. Wired and/or wireless links may be used for components to communicate both within a single device and across multiple devices.

The example described herein of specific chromatic color channels for the OCCs (e.g., red-green and yellow-blue) is merely illustrative. In general, any desired chromatic color channels may be used for the two chromatic channels in an OCC representation.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising a display and control circuitry, wherein the control circuitry is configured to:
    obtain first image data in a first channel, second image data in a second channel, and third image data in a third channel, wherein the first image data, the second image data, and the third image data each has a first resolution;
    based on point-of-gaze information received from a gaze-tracking system, compress the first image data by at least compressing a first subset of the first image data that corresponds to a first portion of the display to have a second resolution that is less than the first resolution; and
    based on the point-of-gaze information, compress the second image data by at least compressing a second subset of the second image data that corresponds to a second portion of the display to have the second resolution, wherein the second portion of the display is larger than the first portion of the display.

2. The electronic device defined in claim 1, wherein the control circuitry is further configured to:
    based on the point-of-gaze information, compress the third image data by at least compressing a third subset of the second image data that corresponds to a third portion of the display to have the second resolution, wherein the third portion of the display is larger than the first portion of the display.

3. The electronic device defined in claim 2, wherein the third portion of the display is the same as the second portion of the display.

4. The electronic device defined in claim 1, wherein the first channel is an achromatic channel, the second channel is a first chromatic channel, and the third channel is a second chromatic channel.

5. The electronic device defined in claim 4, wherein the first chromatic channel is a red-green channel and the second chromatic channel is a yellow-blue channel.

6. The electronic device defined in claim 1, wherein the control circuitry is further configured to:
    receive fourth image data in a fourth channel, fifth image data in a fifth channel, and sixth image data in a sixth channel, wherein obtaining the first image data in the first channel, the second image data in the second channel, and the third image data in the third channel comprises converting the fourth image data, the fifth image data, and the sixth image data into the first image data, the second image data, and the third image data.

7. The electronic device defined in claim 6, wherein the fourth channel is a red channel, wherein the fifth channel is a blue channel, wherein the sixth channel is a green channel, wherein the first channel is an achromatic channel, wherein the second channel is a first chromatic channel, and wherein the third channel is a second chromatic channel.

8. The electronic device defined in claim 1, wherein compressing the first image data comprises leaving a third subset of the first image data corresponding to a third portion of the display with the first resolution in the compressed first image data.

9. The electronic device defined in claim 8, wherein compressing the second image data comprises leaving a fourth subset of the second image data corresponding to a fourth portion of the display with the first resolution in the compressed second image data and wherein the third portion is larger than the fourth portion.

10. The electronic device defined in claim 9, wherein compressing the first image data comprises compressing a fifth subset of the first image data corresponding to a fifth portion of the display to have a third resolution in the compressed first image data and wherein the third resolution is between the first resolution and the second resolution.

11. The electronic device defined in claim 10, wherein compressing the second image data comprises compressing a sixth subset of the second image data corresponding to a sixth portion of the display to have the third resolution and wherein the fifth portion is larger than the sixth portion.

12. The electronic device defined in claim 1, wherein the control circuitry is further configured to:
    based on the point-of-gaze information, compress the third image data by at least compressing a third subset of the second image data that corresponds to a third portion of the display to have the second resolution, wherein the third portion of the display is larger than the first portion of the display, wherein the first channel is an achromatic channel, wherein the second channel is a first chromatic channel, and wherein the third channel is a second chromatic channel; and
    convert the compressed first image data, the compressed second image data, and the compressed third image data from the first, second, and third channels to a red color channel, a blue color channel, and a green color channel.

13. The electronic device defined in claim 12, wherein the display comprises an array of pixels and display driver circuitry configured to control the array of pixels to display images and wherein the control circuitry is configured to provide the converted image data in the red, blue, and green channels to the display driver circuitry.

14. An electronic device configured comprising:
    a display;
    an image data source configured to generate image data for the display in red, blue, and green color channels;
    color channel conversion circuitry configured to convert the image data from the red, blue, and green color channels to an achromatic color channel, a first chromatic color channel, and a second chromatic color channel;
    a gaze-tracking system configured to obtain point-of-gaze information; and
    compression circuitry configured to, after converting the image data and based on the point-of-gaze information, compress the image data, wherein compressing the image data comprises compressing the first and second chromatic channels by a greater amount than the achromatic color channel.

15. The electronic device defined in claim 14, wherein compressing the first and second chromatic channels by a greater amount than the achromatic color channel comprises:
- compressing a first subset of the image data for the achromatic color channel that corresponds to a first portion of the display to have a second resolution that is less than the first resolution; and
- compressing a second subset of the image data for the first chromatic color channel and a third subset of the image data for the second chromatic color channel to have the second resolution, wherein the second and third subsets correspond to a second portion of the display and wherein the second portion is larger than the first portion.

16. The electronic device defined in claim 14, wherein compressing the first and second chromatic channels by a greater amount than the achromatic color channel comprises:
- leaving a first subset of the image data for the achromatic color channel uncompressed, wherein the first subset corresponds to a first portion of the display; and
- leaving a second subset of the image data for the first chromatic color channel and a third subset of the image data for the second chromatic color channel uncompressed, wherein the second and third subsets correspond to a second portion of the display, and wherein the first portion is larger than the second portion.

17. The electronic device defined in claim 14, further comprising:
- additional color channel conversion circuitry configured to convert the compressed image data from the achromatic color channel, the first chromatic color channel, and the second chromatic color channel to the red, blue, and green color channels.

18. The electronic device defined in claim 17, wherein the display comprises an array of pixels and display driver circuitry configured to control the array of pixels to display images and wherein the display driver circuitry is configured to receive image data from the additional color channel conversion circuitry.

19. A system comprising:
- a display;
- a gaze-tracking system configured to determine point-of-gaze information; and
- control circuitry configured to:
  - based on the point-of-gaze information, compress first image data for a first channel and having a first resolution by at least compressing a first subset of the first image data that corresponds to a first portion of the display to have a second resolution that is less than the first resolution; and
  - based on the point-of-gaze information, compress second image data for a second channel and having the first resolution by at least compressing a second subset of the second image data that corresponds to a second portion of the display to have the second resolution, wherein the second portion of the display is larger than the first portion of the display.

20. The system defined in claim 19, wherein the display is configured to display images based at least on the compressed first image data and the compressed second image data.

* * * * *

UNITED STATES PATENT AND TRADEMARK OFFICE
CERTIFICATE OF CORRECTION

| | | |
|---|---|---|
| PATENT NO. | : 12,407,837 B1 | Page 1 of 1 |
| APPLICATION NO. | : 18/082416 | |
| DATED | : September 2, 2025 | |
| INVENTOR(S) | : Andrew B Watson | |

It is certified that error appears in the above-identified patent and that said Letters Patent is hereby corrected as shown below:

In the Claims

Column 12, Line 51, "An electronic device configured comprising:" should read -- An electronic device comprising: --

Signed and Sealed this
Twenty-first Day of October, 2025

John A. Squires
*Director of the United States Patent and Trademark Office*